United States Patent
Liu et al.

(10) Patent No.: US 11,127,151 B2
(45) Date of Patent: Sep. 21, 2021

(54) METHOD AND DEVICE FOR ACQUIRING TARGET OBJECT, AND ROBOT

(71) Applicant: SHEN ZHEN KUANG-CHI HEZHONG TECHNOLOGY LTD., Shenzhen (CN)

(72) Inventors: Ruopeng Liu, Shenzhen (CN); Yicun Ouyang, Shenzhen (CN)

(73) Assignee: SHEN ZHEN KUANG-CHI HEZHONG TECHNOLOGY LTD, Guangdong (CN)

( * ) Notice: Subject to any disclaimer, the term of this patent is extended or adjusted under 35 U.S.C. 154(b) by 178 days.

(21) Appl. No.: 16/450,003

(22) Filed: Jun. 24, 2019

(65) Prior Publication Data

US 2019/0311491 A1 Oct. 10, 2019

Related U.S. Application Data

(63) Continuation of application No. PCT/CN2017/092034, filed on Jul. 6, 2017.

(30) Foreign Application Priority Data

Dec. 22, 2016 (CN) .......................... 201611199672.5

(51) Int. Cl.
*G06T 7/70* (2017.01)
*G06T 7/194* (2017.01)
(Continued)

(52) U.S. Cl.
CPC .................. *G06T 7/70* (2017.01); *G06T 7/10* (2017.01); *G06T 7/194* (2017.01); *G06T 7/20* (2013.01);
(Continued)

(58) Field of Classification Search
None
See application file for complete search history.

(56) References Cited

U.S. PATENT DOCUMENTS

| 2008/0181459 A1 | 7/2008 | Martin |
| 2011/0216972 A1 | 9/2011 | Christie |

(Continued)

FOREIGN PATENT DOCUMENTS

| CN | 102081918 A | 6/2011 |
| CN | 102402680 A | 4/2012 |

(Continued)

OTHER PUBLICATIONS

International Search Report for corresponding application PCT/CN2017/092034 filed Jul. 6, 2017; dated Sep. 29, 2017.
(Continued)

*Primary Examiner* — Delomia L Gilliard
(74) *Attorney, Agent, or Firm* — Cantor Colburn LLP

(57) ABSTRACT

A method and device for acquiring a target object, and a robot are provided. The method includes: acquiring a plurality of frames of continuous images in video images, where each frame of image includes a first target object; acquiring, based on the continuous images including the first target object, a first target image from which a background has been removed; acquiring, based on a distance from a first center point of the first target image to a common boundary, a location of a second target object in the first target image, where the first center point is determined based on a color of the second target object, the common boundary is an overlapping boundary of the second target object and the first target object, and the second target object is included in the first target object; and extracting the second target object based on the location of the second target object in the first target image.

18 Claims, 4 Drawing Sheets

(51) Int. Cl.
    *G06T 7/50* (2017.01)
    *G06T 7/90* (2017.01)
    *G06T 7/20* (2017.01)
    *G06T 7/10* (2017.01)

(52) U.S. Cl.
    CPC ................. *G06T 7/50* (2017.01); *G06T 7/90* (2017.01); *G06T 2207/10016* (2013.01); *G06T 2207/20072* (2013.01); *G06T 2207/20216* (2013.01); *G06T 2207/20224* (2013.01)

(56) References Cited

U.S. PATENT DOCUMENTS

| | | |
|---|---|---|
| 2012/0062736 A1 | 3/2012 | Xiong |
| 2012/0069168 A1 | 3/2012 | Huang |
| 2015/0221066 A1* | 8/2015 | Kobayashi ............. G06T 7/194 382/284 |
| 2016/0092056 A1 | 3/2016 | Yang |
| 2017/0228867 A1* | 8/2017 | Baruch ............. G06K 9/00362 |
| 2017/0277944 A1* | 9/2017 | Li ............... G06F 3/00 |
| 2017/0337711 A1* | 11/2017 | Ratner ................ H04N 19/176 |
| 2018/0295375 A1* | 10/2018 | Ratner ................... G06T 7/136 |

FOREIGN PATENT DOCUMENTS

| | | | |
|---|---|---|---|
| CN | 102521567 A | | 6/2012 |
| CN | 102081918 B | * | 2/2013 |
| CN | 104050443 A | | 9/2014 |
| CN | 104750242 A | | 7/2015 |
| CN | 105825193 A | | 8/2016 |

OTHER PUBLICATIONS

European Search Report for corresponding application EP 17 88 3137; Report dated May 4, 2020.

* cited by examiner

METHOD AND DEVICE FOR ACQUIRING TARGET OBJECT, AND ROBOT

CROSS REFERENCE TO RELATED APPLICATIONS

This application is a continuation of International Patent Application Number PCT/CN2017/092034 filed on Jul. 6, 2017, which claimed priority to Chinese Patent Application Number 201611199672.5 filed on Dec. 22, 2016, the contents of said applications being incorporated herein by reference in their entirety.

TECHNICAL FIELD

The present invention relates to the image processing field, and in particular, to a method and a device for acquiring a target object, and a robot.

BACKGROUND

For studying artificial intelligence/deep learning/gesture recognizing, massive pictures of different palms are required. The pictures are stored, and x-axis coordinates/y-axis coordinates/widths/heights of the palms further need to be recorded. In addition, shapes and gestures of palms of different people are used. However, currently, images of different palms performing different actions are usually acquired by taking photos of the palms. This is incoherent, a speed of collecting pictures by a mobile phone is relatively slow, and collected pictures include an unnecessary arm part.

For a prior-art problem that a collected image includes content similar to a target object, and consequently a subsequent processing process is complex, no effective solution is currently proposed.

SUMMARY

Embodiments of the present invention provide a method and a device for acquiring a target object, and a robot, to at least resolve a prior-art technical problem that a collected image includes content similar to a target object, and consequently a subsequent processing process is complex.

According to one aspect of the embodiments of the present invention, a method for acquiring a target object is provided, including: acquiring a plurality of frames of continuous images in video images, where each frame of image includes a first target object; acquiring, based on the continuous images including the first target object, a first target image from which a background has been removed; acquiring, based on a distance from a first center point of the first target image to a common boundary, a location of a second target object in the first target image, where the first center point is determined based on a color of the second target object, the common boundary is an overlapping boundary of the second target object and the first target object, and the second target object is included in the first target object; and extracting the second target object based on the location of the second target object in the first target image.

According to another aspect of the embodiments of the present invention, a device for acquiring a target object is provided, including: a first acquisition module, configured to acquire a plurality of frames of continuous images in video images, where each frame of image includes a first target object; a second acquisition module, configured to acquire, based on the continuous images including the first target object, a first target image from which a background has been removed; a third acquisition module, configured to acquire, based on a distance from a first center point of the first target image to a common boundary, a location of a second target object in the first target image, where the first center point is determined based on a color of the second target object, the common boundary is an overlapping boundary of the second target object and the first target object, and the second target object is included in the first target object; and an extraction module, configured to extract the second target object based on the location of the second target object in the first target image.

According to another aspect of the embodiments of the present invention, a robot is further provided, including any device for acquiring a target object.

In the embodiments of the present invention, the plurality of frames of continuous images in the video images that include the first target object are acquired, the first target image from which the background has been removed is acquired based on the continuous images including the first target object, the location of the second target object in the first target image is acquired based on the distance from the first center point of the first target image to the common boundary, and the second target object is extracted based on the location of the second target object in the first target image. In the foregoing solution, dynamic images in the video images are tracked, and the first target image from which the background has been removed is collected, so as to achieve an effect of quickly collecting a target image. In addition, the location of the second target object is determined based on the first center point and the common boundary of the first target object and the second target object, so that the second target object can be extracted from an original image. This resolves the prior-art technical problem that a collected image includes content similar to a target object, and consequently a subsequent processing process is complex.

BRIEF DESCRIPTION OF DRAWINGS

The drawings described herein provide further understanding of the present invention, and form a part of this application. Schematic embodiments of the present invention and descriptions thereof are used to explain the present invention but do not constitute an inappropriate limitation on the present invention. In the drawings.

DESCRIPTION OF EMBODIMENTS

Figure 1:
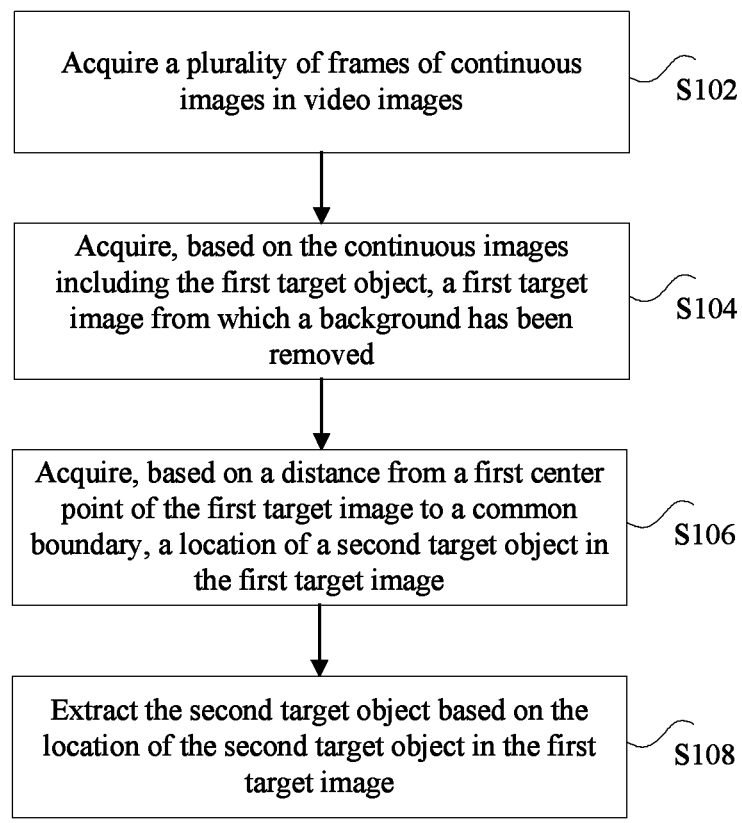
FIG. 1 is a flowchart of a method for acquiring a target object according to an embodiment of the present invention.

To make a person skilled in the art better understand solutions of the present invention, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be noted that terms such as "first" and "second" in the specification, claims, and accompanying drawings of the present invention are used to distinguish between similar objects, and are not necessarily used to describe a particular sequence or order. It should be understood that data used in such a way may be interchangeable in a proper circumstance, so that the embodiments of the present invention described herein can be implemented in a sequence other than those shown in the drawings or described herein. Moreover, terms "including", "having", and any other variant thereof are intended to cover a non-exclusive inclusion. For example, a process, a method, a system, a product, or a device that includes a series of steps or units is not necessarily limited to those expressly listed steps or units, but may include other steps or units that are not expressly listed or that are inherent to such a process, method, product, or device.

Embodiment 1

According to an embodiment of the present invention, an embodiment of a method for acquiring a target object is provided. It should be noted that steps shown in a flowchart of a drawing may be performed in a computer system of a group of computer executable instructions. In addition, although a logical sequence is shown in the flowchart, in some circumstances, the shown or described steps may be performed in a sequence different from the sequence herein.

FIG. 1 is a flowchart of a method for acquiring a target object according to an embodiment of the present invention. As shown in FIG. 1, the method includes the following steps:

Step S102: Acquire a plurality of frames of continuous images in video images, where each frame of image includes a first target object.

Figure 2:
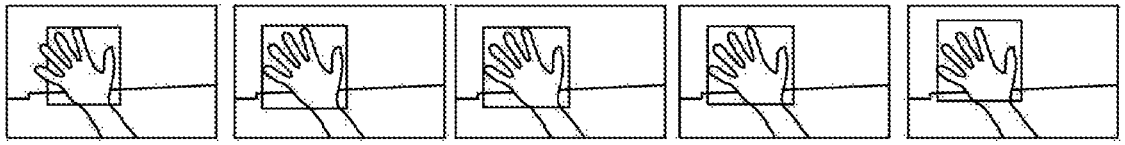
FIG. 2 is a schematic diagram of acquiring continuous images including a first target object from a video according to an embodiment of the present invention.

Specifically, the continuous images may be images in a video. For example, a user performs actions in front of a camera, and the camera records a video of performing the actions by the user, where the video records continuous images including the user. FIG. 2 is a schematic diagram of acquiring continuous images including a first target object from a video according to an embodiment of the present invention. In this example, the continuous images are images formed by waving a hand by a user in front of a camera, and the first target object is a part of the user that appears in the images.

Step S104: Acquire, based on the continuous images including the first target object, a first target image from which a background has been removed.

In an optional embodiment, in this embodiment, an image of waving an arm by a user in front of a camera is acquired, and a part of the user that appears in the image is used as a first target object, and the first target object is obtained after a background is removed. For details, refer to FIG. 3.

Step S106: Acquire, based on a distance from a first center point of the first target image to a common boundary, a location of a second target object in the first target image, where the first center point is determined based on a color of the second target object, the common boundary is an overlapping boundary of the second target object and the first target object, and the second target object is included in the first target object.

Figure 3:
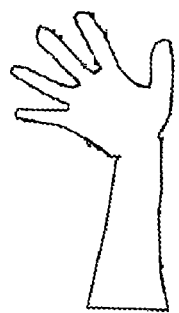
FIG. 3 is an optional schematic diagram of a first target image from which a background has been removed according to an embodiment of the present invention.

In an optional embodiment, still taking FIG. 3 as an example, in this example, the first target object is still the part of the user that appears in the image, the second target object is only a palm part in the image, and the common boundary of the first target object and the second target object is a boundary of the palm. The first center point may be determined based on the color of the second target object. Then a range of the palm is estimated based on a distance from the first center point to the boundary of the palm, so as to determine a location of the palm in the first target image.

Step S108: Extract the second target object based on the location of the second target object in the first target image.

After the location of the second target object in the first target image is determined, the second target object may be captured, so as to acquire the second target object.

In an optional embodiment, a camera acquires a video of waving a hand by a user in front of the camera, and transfers the video to Matlab. Then a moving object (in this example, the moving object is the hand) in the video is tracked. Afterwards, a color of the hand and a color similar to the color of the hand are recorded, a hand part is stored and placed into an image, and other parts (for example, an arm) excluding the hand are removed.

It can be learned from the foregoing that, in the foregoing solution of this application, the plurality of frames of continuous images in the video images that include the first target object are acquired, the first target image from which the background has been removed is acquired based on the continuous images including the first target object, the location of the second target object in the first target image is acquired based on the distance from the first center point of the first target image to the common boundary, and the second target object is extracted based on the location of the second target object in the first target image. In the foregoing solution, dynamic images in the video images are tracked, and the first target image from which the background has been removed is collected, so as to achieve an effect of quickly collecting a target image. In addition, the location of the second target object is determined based on the first center point and the common boundary of the first target object and the second target object, so that the second target object can be extracted from an original image. This resolves a prior-art technical problem that a collected image includes content similar to a target object, and consequently a subsequent processing process is complex.

Optionally, according to the foregoing embodiment of this application, the acquiring, based on the continuous images including the first target object, a first target image from which a background has been removed in step S104 includes the following steps:

Step S1041: Obtain a weight distribution graph of a current frame of image based on weights of a color value of the first target image in the current frame of image among the plurality of frames of continuous images, where the weights are used to represent weights of the color value of the first target object in all color values of the current frame of image.

Figure 4:
FIG. 4 is an optional schematic diagram of a weight distribution graph according to an embodiment of the present invention.

Specifically, because the weight distribution graph is used to determine a weight of the first target object in an image, a weight of a background image is nearly zero, and the weight of the first target object in the image is relatively large. Therefore, the first target image from which the background has been removed may be obtained by using the weight distribution graph. In an optional embodiment, FIG. 4 is an optional schematic diagram of a weight distribution graph according to an embodiment of the present invention. A profile of the first target object has a relatively large weight, and weights of other locations are relatively small, or are zero.

Step S1043: Determine, in the weight distribution graph, a square including the first target object.

Specifically, the square is used to determine a specific location of the first target object in the image.

Step S1045: Acquire, based on the square of the first target object, the first target image from which the background has been removed.

Because the square indicates the location of the first target object, the first target image from which the background has been removed is obtained after an image outside the square is removed.

It can be learned from the foregoing that, according to the foregoing steps in this application, the first target image from which the background has been removed can be quickly obtained from the continuous images of the video. This resolves a technical problem that a speed of collecting images is slow, and achieves a technical effect of quickly collecting images.

Optionally, according to the foregoing embodiment of this application, the obtaining a weight distribution graph of a current frame of image based on weights of a color value of the first target image in the current frame of image among the plurality of frames of continuous images in step S1041 includes the following steps:

Step S10411: Acquire the weights of the color value of the first target object in the plurality of frames of images.

Step S10413: Mix and filter the weights of the color value of the first target object in the plurality of frames of images, to obtain the weight distribution graph of the current frame of image.

Optionally, according to the foregoing embodiment of this application, the acquiring the weights of the color value of the first target object in the plurality of frames of images in step S10411 includes the following steps:

Step S10411a: Store a first acquired image including the first target object, and acquire a background image and a gradient background image of the first target object based on the first image including the first target object.

To simplify a calculation process, before this step, a color value of the video may be further changed from 256 colors to 256/step colors (such as 64 colors). A color difference value is reduced, so that a color difference between different videos can be compared.

Specifically, information about a frame of a first image in the continuous images is stored, to calculate an image used for comparison.

In an optional embodiment, still taking the image acquired by waving the arm by the user in front of the camera as an example, the background image and the gradient background image of the first target object may be calculated in the following manner:

Generate a background image, and after the first image is stored, update the background image each time a new image is acquired:

$$\text{Background image file} = \frac{\text{New image} + \text{rate} \cdot \text{Background image file}}{1 + \text{rate}}.$$

In this example, the rate is used to represent a change rate of the current image and a previous image. In this method, the rate is set to 0.9.

Because a gradient difference needs to be calculated, a gradient background image file also needs to be generated. The gradient background image file is calculated by using the following method:

$$\text{Gradient} = \left|\frac{\partial}{\partial x}(\text{Image})\right| + \left|\frac{\partial}{\partial y}(\text{Image})\right|,$$

where an initially stored gradient background image file is a gradient of the first image, and then each time a new image is acquired, the gradient background image file is updated as follows:

$$\text{Gradient background image file} = \frac{\text{Gradient of a new image} + \text{rate} \cdot \text{Gradient background image file}}{1 + \text{rate}},$$

where the rate is still 0.9.

Step S10411b: Subtract a background image of a previous frame of image from the color value of the current frame of image, to obtain a first weight.

In an optional embodiment, still in the foregoing example, a latest frame of image is first entered. An absolute value of the previously acquired gradient image file is subtracted from the new frame, to obtain the first weight.

Step S10411c: Subtract a gradient background image of the previous frame of image from the color value of the current frame of image, to obtain a second weight.

In an optional embodiment, still in the foregoing example, a gradient of the background image of the previous frame is subtracted from the color value of the current frame of image, to obtain the second weight.

Step S10411d: Subtract the background image of the previous frame of image from a color gradient of the current frame of image, to obtain a third weight.

In an optional embodiment, still in the foregoing example, the gradient background image of the previous frame is subtracted from the color gradient of the current frame of image, to obtain the third weight.

Step S10411e: Subtract a preset gradient in gradients of the background image of the previous frame of image from the color value of the current frame of image, to obtain a fourth weight.

In an optional embodiment, still in the foregoing example, the preset gradient may be a top 10% gradient that is relatively large in the gradients of the background image. For example, gradients of the background image of the previous frame of image are subtracted from the color value of the current frame of image, obtained values are sorted in descending order, largest 10% to 15% of the values are extracted, and others are cleared.

Step S10411f: Subtract a main color value of the first target object from the color value of the current frame of image, to obtain a fifth weight.

In an optional embodiment, still in the foregoing example, a main color of the first target object is a flesh color, and a difference between the color value of the current frame of image and the flesh color is calculated, to obtain the fifth weight. A color value of the flesh color may be determined through customization, for example, $$\begin{bmatrix} 250 \\ 200 \\ 125 \end{bmatrix} \pm \begin{bmatrix} 50 \\ 50 \\ 50 \end{bmatrix}.$$

The color value of the flesh color is subtracted from the color value of the current frame of image, and a negative number is cleared, thereby obtaining the fifth weight.

Herein, it should be noted that this step may be ignored if the first target object has a plurality of colors and it is difficult to determine a main color.

Optionally, according to the foregoing embodiment of this application, the mixing and filtering the weights of the color value of the first target object in the plurality of frames of images, to obtain the weight distribution graph of the current frame of image in step S10413 includes the following steps:

Step S10413a: Perform weighting on the first weight, the second weight, the third weight, the fourth weight, and the fifth weight based on a preset ratio, to obtain a mixed weight.

Still in the foregoing example, weighting is performed on the plurality of weights. Preset $$\text{weight ratios are: } \begin{cases} \alpha_1 = 1.5 \\ \alpha_2 = 1.0 \\ \alpha_3 = 1.0 \\ \alpha_4 = 1.0 \\ \beta_5 = 1.0 \end{cases}.$$

Total mixed value =

$\alpha_1 \cdot$ Previous stairway image subtracted from the frame color value +

$\alpha_2 \cdot$ Gradient of the previous stairway image subtracted from the frame color value + $\alpha_3 \cdot$ Previous gradient stairway image subtracted from a gradient of the frame color value +

$\alpha_4 \cdot$ percentage gradient of the gradient of the previous stairway image subtracted from the frame color value −

$\beta_5 \cdot$ Distance between the frame color value and the flesh color

For ease of operation, it is considered to average impact of a color difference, and a log element is added to weight calculation:

Weight = $\alpha_1 \cdot \log_2$(Previous stairway image subtracted from the frame color value) +

$\alpha_2 \cdot \log_2$(Gradient of the previous stairway image subtracted from the frame color value) +

$\alpha_3 \cdot \log_2$(Previous gradient stairway image subtracted from a gradient of the frame color value) +

$\alpha_4 \cdot \log_2$(*Maxium* percentage gradient of the gradient of the previous stairway image subtracted from the frame color value) −

$\beta_5 \cdot \log_2$(Distance between the frame color value and the flesh color)

Step S10413b: Perform weight processing on the mixed weight of the image, where a weight used to perform the weight processing tends to decrease from a center of the current frame of image to a boundary of the current frame of image.

In an optional embodiment, still in the foregoing example, weight processing may be performed on the mixed weight of the image by using the following steps:

The mixed value is originally formed by three colors (RGB). First, combine values of the three colors, that is, add up three values of RGB.

Decrease, based on a rate, values around a weight obtained after the colors are combined.

The weight is multiplies by the following matrix:

$$\begin{pmatrix} 0.49 & \ldots & 0.7 & \ldots & 0.49 \\ \vdots & \ddots & \vdots & \iddots & \vdots \\ 0.7 & \ldots & 1.0 & \ldots & 0.7 \\ \vdots & \iddots & \vdots & \ddots & \vdots \\ 0.49 & \ldots & 0.7 & \ldots & 0.49 \end{pmatrix}$$

A weight of a pixel in a middle location does not change, but a weight decreases (in a linear manner) from the middle to a left or right side. The weight is multiplied by 0.7 at a left or right edge, and is further multiplied by 0.7 at an upper or lower edge. That is, the weight is multiplied by 0.49 in four corner locations. As a result, a weight in a middle area is relatively large, and a weight in an edge area is relatively small.

If it is relatively easy to determine the main color of the first target object (for example, in this embodiment, it is relatively easy to determine that the main color is the flesh color), when the main color is not close to a black color or a white color, weights of locations close to the black color or the white color are canceled. Therefore, weights of locations in a video that are close to the black color or the white color are cleared. Values of the black color are (0, 0, 0), and values of the white color are (255, 255, 255). When a sum of three color values of a location in the video is less than 150 or is greater than 675, a weight of the location is zero cleared. This program is specific to movement of a hand.

Step S10413c: Add an image obtained after the weight processing to weights in a weight distribution graph of the previous frame of image, and perform averaging processing. Extract a preset quantity of weights from weights obtained after the averaging processing, and subtract the preset quantity of weights from the weights obtained after the averaging processing, to obtain the weight distribution graph of the image.

Specifically, a weight is added up with an old weight, and the old weight is a weight in the weight distribution graph of the previous frame of image.

In an optional embodiment, still in the foregoing example, the averaging processing may be performed by the following steps:

Change a weight of an original point to an average value of surrounding 25 points (or 9 points or others, in this case, 25 points are used).

For example:

$$\begin{pmatrix} 11 & 3 & 10 & 19 & 15 \\ 21 & 17 & 2 & 9 & 20 \\ 12 & 23 & 6 & 24 & 1 \\ 25 & 13 & 22 & 7 & 14 \\ 4 & 16 & 5 & 18 & 8 \end{pmatrix} \rightarrow \begin{pmatrix} * & * & * & * & * \\ * & * & * & * & * \\ * & * & 13 & * & * \\ * & * & * & * & * \\ * & * & * & * & * \end{pmatrix}$$

That is, without considering two most marginal rows, a weight of each point is averaged based on surrounding 25 points.

Then, sort weights in descending order, extract largest 10% (or in a range of 10% to 15%) weights, and clear zero other weights. That is, select 10% of the values, then subtract the values from the weights, and clear negative numbers. In other words, smallest 90% data disappears. Herein, it should be noted that, finally obtained weights form the weight distribution graph. Weights in the weight distribution graph of the current frame is old weight data of a next frame of image.

Optionally, according to the foregoing embodiment of this application, the determining, in the weight distribution graph, a square including the first target object in step S1043 includes the following step:

Step S10431: Determine a plurality of squares based on color values in the weight distribution graph, and select, from the plurality of squares, a square satisfying a preset condition, where the preset condition includes:

a weight in the square is higher than a preset target value;
an area of the square is within a first preset range;
a length of the square in a first dimension and a length of the square in a second dimension are within a second preset range, where the first dimension is perpendicular to the second dimension; or
a difference between a total weight of squares of the current frame of image and an average total weight of a preset quantity of previous images is within a third preset range.

After the plurality of squares are determined, it may be determined, based on the preset condition mentioned above, whether a square is to be accepted. An accepted square is a square including the first target object.

Still in the foregoing embodiment, conditions for determining whether a square is to be accepted may include:

1. When a weight in the square is lower than a target, the square is not to be accepted.
2. When an area of the square is not within a target range, the square is not to be accepted.
3. When a length of the square in an x axis is R times greater than (or less than) a length of the square in a y axis, the square is not to be accepted.
4. When the length of the square in the x axis (or the y axis) is greater than a target, the square is not to be accepted.
5. When a total weight in a new square is less than 85% of an average total weight of previous 10 effective squares, the square is not to be accepted.

Optionally, according to a foregoing embodiment, the determining a plurality of squares based on color values in the weight distribution graph in step S10431 includes the following steps:

Step A: Determine a point with a maximum weight in the weight distribution graph.

Figure 5:
FIG. 5 is an optional schematic diagram of determining a point with a maximum weight in a weight distribution graph according to an embodiment of the present invention.

FIG. 5 is an optional schematic diagram of determining a point with a maximum weight in a weight distribution graph according to an embodiment of the present invention. In this schematic diagram, a point between an index finger and a thumb is the point with the maximum weight.

Step B: Use the point with the maximum weight as a second center point, and expand a square to a fourth preset range.

Figure 6:
FIG. 6 is an optional schematic diagram of expanding a square according to an embodiment of the present invention.

Expansion starts from coordinates of the maximum value until a specific range is reached. If a location whose weight is greater than 0 is found in the expansion range, a range of the square expands until reaching the location whose weight is greater than 0. Still in the foregoing embodiment, a schematic diagram of expanding the square may be shown in FIG. 6. In this example, the second center point is still the point between the index finger and the thumb, and a rectangular block in the figure is the first preset range determined after expansion of the square.

Step C: After the square is expanded to the fourth preset range, shrink the square, until an average value of color values at edges of the square is less than an average value of a preset ratio and a sum of the color values of the image.

Figure 7:
FIG. 7 is an optional schematic diagram of shrinking a square according to an embodiment of the present invention.

Specifically, after expansion, the range of the square shrinks. When an average value of an edge in the range of the square is lower than a ratio value multiplied by an overall average value, the edge location is canceled. The overall average value is an average value of existing effective pixel gray values (the gray values are greater than a preset value) in an image. Still in the foregoing embodiment, a schematic diagram of shrinking the square may be shown in FIG. 7. A rectangular block surrounding the palm is a shrunk square.

Step D: Clear zero the color values in a range determined by the square.

Figure 8:
FIG. 8 is an optional schematic diagram of clearing color values in a range determined by a square according to an embodiment of the present invention.

Still in the foregoing embodiment, the clearing color values in a range determined by the square may be shown in FIG. 8. The color values in the range included in the square have been cleared.

Step E: Repeat step A to step D, to obtain the plurality of squares.

Figure 9:
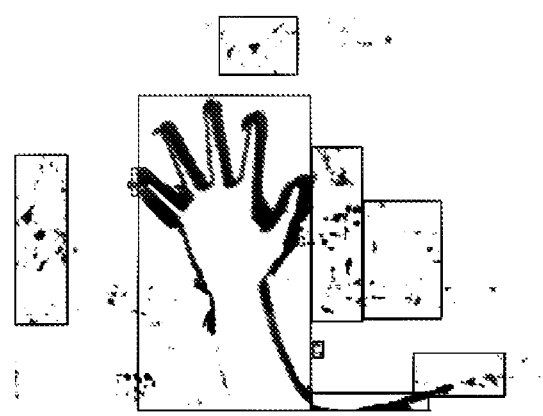
FIG. 9 is an optional schematic diagram of a plurality of squares that are obtained according to an embodiment of the present invention.

Still in the foregoing embodiment, the plurality of squares that are obtained may be shown in FIG. 9. Each rectangle in the figure is a square.

Optionally, according to the foregoing embodiment of this application, the acquiring, based on the square of the first target object, the first target image from which the background has been removed in step S1045 includes the following steps:

Step S10451: Determine a main color of the first target object, and determine a similar color of the main color, where a color difference between the similar color and the main color is within a preset color difference range.

Before the foregoing step, low-precision image coordinates may be further restored to original image coordinates. A similar color that appears most frequently is found in an original image range. Still in the foregoing embodiment, the main color is a color of the hand, that is, the flesh color.

The color of the hand may be calculated by using the following method: First, a quantity of color values is reduced. Color values are changed from [0, 1, 2, 3, ... , 254, 255, 256] to [0, 4, 8, 12, ... , 248, 252, 256]. Color values 0 and 1 are categorized as 0; color values 2, 3, 4, 5 are categorized as 4; color values 6, 7, 8, 9 are categorized as 8; and color values 10, 11, 12, 13 are categorized as 12; and so on. Then, a color value that appears most frequency in the figure is the color of the hand.

The similar color of the main color may be further determined by using the following method: Any color is formed by three colors (red, green, and blue). Values on a computer are from 0 to 256. (0, 0, 0) indicates all black, and (256, 256, 256) indicates all white. A color difference a sum of red, green, and blue value differences between two colors. For example, values of one color are (200, 120, 80), and values of another color are (160, 90, 20); then a color difference between the two colors is 40+30+60=130. Therefore, if a color difference between the point and the hand is less than or equal to 70, the point is set as a similar color of the hand; or if the color difference is greater than 70, the point is not set as a similar color of the hand.

Step S10453: Determine the first center point in coordinates of the similar color, where coordinates of the first center point are closest to the second center point among coordinates of all similar colors.

Step S10455: Determine a preset quantity of points outward in a preset direction by using the first center point as a center, and if any point indicates a similar color of the main color, connect points that indicate the similar color of the main color, and perform expansion outward and re-determine points, until determined points do not include the similar color.

Figure 10:
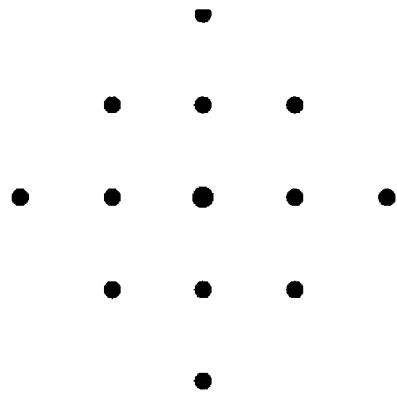
FIG. 10 is an optional schematic diagram of determining points for acquiring a hand from which a background has been removed according to an embodiment of the present invention.

Still in the foregoing embodiment, a hand from which a background has been removed (the first target image from which the background has been removed) may be acquired based on the similar color in the following manner: FIG. 10 is an optional schematic diagram of determining points for acquiring the hand from which the background has been removed according to an embodiment of the present invention. Starting from a center point of the similar color of the hand, when 12 points around the center point indicate the similar color of the hand, a hand formed by connected points is added, until there is no other connected point, and a non-connected part is removed.

Optionally, according to the foregoing embodiment of this application, the acquiring, based on a distance from a first center point of the first target image to a common boundary, a location of a second target object in the first target image in step S106 includes the following steps:

Step S1061: Determine an upper limit and a lower limit of the second target object based on a largest distance from the first center point to the common boundary.

Step S1063: Remove points above the upper limit and points below the lower limit from the location, to obtain the second target object.

Figure 11:
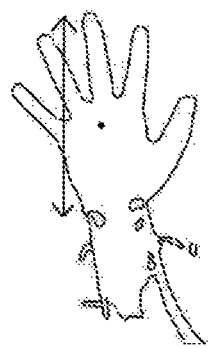
FIG. 11 is a schematic diagram of determining an upper limit and a lower limit of a target according to an embodiment of the present invention.

FIG. 11 is a schematic diagram of determining the upper limit and the lower limit of the target according to an embodiment of the present invention. Still in the foregoing embodiment, the range of the palm is calculated based on a distance from the first center point to an upper limit of the hand by using the following method: First, it is assumed that the distance from the center point to the upper limit of the hand (that is, the largest distance from the center point to the common boundary) is L, and a location at a lower limit of the palm is obtained after L is subtracted from the upper limit of the hand. After the lower limit of the palm is obtained through calculation, a place below the lower limit of the palm is removed, and a remaining place is a final range of a square of the palm.

Optionally, according to the foregoing embodiment of this application, after the second target object is obtained, the method further includes:

acquiring image information of the second target object, and storing the image information in a preset format, where the image information includes coordinates of a square and a size of the second target object.

Still in the foregoing embodiment, the user only needs to wave the hand in front of the camera, and a system may automatically record the range of the square of the palm, and record an image name, and x-axis coordinates, y-axis coordinates, a weight, and a height of the square of the palm by using another file. Stored images are classified into two types: original images without squares, which may be input to another intelligent device and are used for machine learning, gesture recognizing, or artificial intelligence; and images including squares, which are used to determine whether a collected image is proper for use. A record manner may be as follows:

| 0043.jpg | 331 | 129 | 143 | 252 |
| 0044.jpg | 331 | 129 | 144 | 256 |
| 0045.jpg | 301 | 161 | 145 | 237 |
| 0046.jpg | 309 | 166 | 145 | 216 |
| 0047.jpg | 316 | 172 | 149 | 199 |
| 0048.jpg | 321 | 157 | 151 | 206 |
| 0049.jpg | 328 | 158 | 151 | 197 |
| 0050.jpg | 336 | 154 | 151 | 198 |
| 0051.jpg | 346 | 149 | 150 | 203 |
| 0052.jpg | 353 | 138 | 155 | 221 |
| 0053.jpg | 355 | 141 | 154 | 220 |
| 0054.jpg | 350 | 138 | 156 | 220 |
| 0055.jpg | 342 | 136 | 159 | 228 |

Embodiment 2

Figure 12:
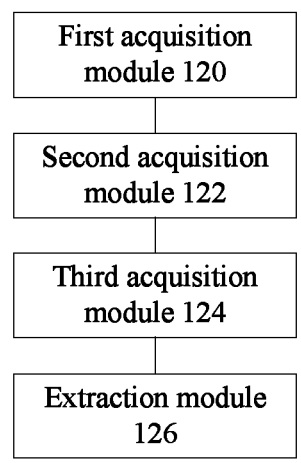
FIG. 12 is an optional schematic diagram of a device for acquiring a target object according to an embodiment of the present invention.

According to an embodiment of the present invention, an embodiment of a device for acquiring a target object is provided. FIG. 12 is an optional schematic diagram of a device for acquiring a target object according to an embodiment of the present invention. As shown in FIG. 12, the device includes:

a first acquisition module 120, configured to acquire a plurality of frames of continuous images in video images, where each frame of image includes a first target object;

a second acquisition module 122, configured to acquire, based on the continuous images including the first target object, a first target image from which a background has been removed;

a third acquisition module 124, configured to acquire, based on a distance from a first center point of the first target image to a common boundary, a location of a second target object in the first target image, where the first center point is determined based on a color of the second target object, the common boundary is an overlapping boundary of the second target object and the first target object, and the second target object is included in the first target object; and an extraction module 126, configured to extract the second target object based on the location of the second target object in the first target image.

It can be learned from the foregoing that, in the foregoing embodiment of this application, the first acquisition module acquires the plurality of frames of continuous images in the video images that include the first target object; the second acquisition module acquires, based on the continuous images including the first target object, the first target image from which the background has been removed; the third acquisition module acquires the location of the second target object in the first target image based on the distance from the first center point of the first target image to the common boundary; and the extraction module extracts the second target object based on the location of the second target object in the first target image. In the foregoing solution, dynamic images in the video images are tracked, and the first target image from which the background has been removed is collected, so as to achieve an effect of quickly collecting a target image. In addition, the location of the second target object is determined based on the first center point and the common boundary of the first target object and the second target object, so that the second target object can be extracted from an original image. This resolves a prior-art technical problem that a collected image includes content similar to a target object, and consequently a subsequent processing process is complex.

Optionally, according to the foregoing embodiment of this application, the second acquisition module includes:

a first acquisition submodule, configured to obtain a weight distribution graph of a current frame of image based on weights of a color value of the first target image in the current frame of image among the plurality of frames of continuous images, where the weights are used to represent weights of the color value of the first target object in all color values of the current frame of image;

a first determining submodule, configured to determine, in the weight distribution graph, a square including the first target object; and a second acquisition submodule, configured to acquire, based on the square of the first target object, the first target image from which the background has been removed.

Optionally, according to the foregoing embodiment of this application, the first acquisition submodule includes:

a weight acquisition unit, configured to acquire the weights of the color value of the first target object in the plurality of frames of images; and a mixing and filtering unit, configured to mix and filter the weights of the color value of the first target object in the plurality of frames of images, to obtain the weight distribution graph of the current frame of image.

Optionally, according to the foregoing embodiment of this application, the weight acquisition unit includes:

a storage subunit, configured to store a first acquired image including the first target object, and acquire a background image and a gradient background image of the first target object based on the first image including the first target object;

a first calculation subunit, configured to subtract a background image of a previous frame of image from the color value of the current frame of image, to obtain a first weight;

a second calculation subunit, configured to subtract a gradient background image of the previous frame of image from the color value of the current frame of image, to obtain a second weight;

a third calculation subunit, configured to subtract the background image of the previous frame of image from a color gradient of the current frame of image, to obtain a third weight;

a fourth calculation subunit, configured to subtract a preset gradient in gradients of the background image of the previous frame of image from the color value of the current frame of image, to obtain a fourth weight; and a fifth calculation subunit, configured to subtract a main color value of the first target object from the color value of the current frame of image, to obtain a fifth weight.

Optionally, according to the foregoing embodiment of this application, the mixing and filtering unit includes:

a weight subunit, configured to perform weighting on the first weight, the second weight, the third weight, the fourth weight, and the fifth weight based on a preset ratio, to obtain a mixed weight;

a processing subunit, configured to perform weight processing on the mixed weight of the image, where a weight used to perform the weight processing tends to decrease from a center of the image to a boundary of the image;

an addition calculation subunit, configured to add an image obtained after the weight processing to weights in a weight distribution graph of the previous frame of image, and perform averaging processing; and an extraction subunit, configured to extract a preset quantity of weights from weights obtained after the averaging processing, and subtract the preset quantity of weights from the weights obtained after the averaging processing, to obtain the weight distribution graph of the image.

Optionally, according to the foregoing embodiment of this application, the first determining submodule includes:

a determining unit, configured to determine a plurality of squares based on color values in the weight distribution graph, and select, from the plurality of squares, a square satisfying a preset condition, where the preset condition includes:

a weight in the square is higher than a preset target value;

an area of the square is within a second preset range;

a length of the square in a first dimension and a length of the square in a second dimension are within a third preset range, where the first dimension is perpendicular to the second dimension; or a difference between a total weight of squares of the current frame of image and an average total weight of a preset quantity of previous images is within a fourth preset range.

Optionally, according to the foregoing embodiment of this application, the determining unit includes:

a first determining subunit, configured to determine a point with a maximum weight in the weight distribution graph;

an expansion subunit, configured to use the point with the maximum weight as a second center point, and expand a square to a first preset range;

a shrinking subunit, configured to: after the square is expanded to the first preset range, shrink the square, until an average value of color values at edges of the square is less than an average value of a preset ratio and the color values of the image;

a second determining subunit, configured to clear color values in a range determined by the square; and a cycling subunit, configured to repeat the functions from the first determining subunit to the second determining subunit, to obtain the plurality of squares.

Optionally, according to the foregoing embodiment of this application, the first acquisition submodule includes:

an acquisition unit, configured to acquire the weights of the color value of the first target object in the plurality of frames of images; and a mixing and filtering unit, configured to mix and filter the weights of the color value of the first target object in the plurality of frames of images, to obtain the weight distribution graph of the image.

Optionally, according to the foregoing embodiment of this application, the third acquisition module includes:

a second determining submodule, configured to determine an upper limit and a lower limit of the second target object based on a largest distance from the first center point to the common boundary; and a removal submodule, configured to remove points above the upper limit and points below the lower limit from the location, to obtain the second target object.

Optionally, according to the foregoing embodiment of this application, the device further includes:

a storage module, configured to acquire image information of the second target object, and store the image information in a preset format, where the image information includes coordinates of a square and a size of the second target object.

Embodiment 3

According to an embodiment of the present invention, an embodiment of a robot is provided, including any device for acquiring a target object in Embodiment 2.

In the device for acquiring a target object included in the robot in the foregoing embodiment, a first acquisition module acquires a plurality of frames of continuous images in video images that include a first target object; a second acquisition module acquires, based on the continuous images including the first target object, a first target image from which a background has been removed; a third acquisition module acquires a location of a second target object in the first target image based on a distance from a first center point of the first target image to a common boundary; and an extraction module extracts the second target object based on the location of the second target object in the first target image. In the foregoing solution, dynamic images in the video images are tracked, and the first target image from which the background has been removed is collected, so as to achieve an effect of quickly collecting a target image. In addition, the location of the second target object is determined based on the first center point and the common boundary of the first target object and the second target object, so that the second target object can be extracted from an original image. This resolves a prior-art technical problem that a collected image includes content similar to a target object, and consequently a subsequent processing process is complex.

Sequence numbers of the foregoing embodiments of the present invention are merely used for description, and do not indicate superiority or inferiority of the embodiments.

In the foregoing embodiments of the present invention, descriptions of the embodiments have respective emphases. For a part not described in detail in an embodiment, reference may be made to related descriptions in another embodiment.

In the several embodiments provided in this application, it should be understood that the disclosed technical content may be implemented in other manners. The described device embodiments are merely examples. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the units or modules may be implemented in electrical or other forms.

The units described as separate parts may or may not be physically separated, and parts shown as units may or may not be physical units, may be located in one position, or may be distributed on a plurality of units. Some or all of the units may be selected according to actual requirements to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of the present invention. The foregoing storage medium includes any medium that can store program code, such as a USB flash drive, a read-only memory (ROM, Read-Only Memory), a random access memory (RAM, Random Access Memory), a removable hard disk, a magnetic disk, or an optical disc.

The foregoing descriptions are merely preferred implementations of the present invention. It should be noted that, improvements and modifications may be further made by a person of ordinary skill in the art without departing from the principles of the present invention, and these improvements and modifications shall also be construed as falling within the protection scope of the present invention.

What is claimed is:

1. A method for acquiring a target object, comprising:
    acquiring a plurality of frames of continuous images in video images, wherein each frame of image comprises a first target object;
    acquiring, based on the continuous images comprising the first target object, a first target image from which a background has been removed;
    acquiring, based on a distance from a first center point of the first target image to a common boundary, a location of a second target object in the first target image, wherein the first center point is determined based on a color of the second target object, the common boundary is an overlapping boundary of the second target object and the first target object, and the second target object is comprised in the first target object; and
    extracting the second target object based on the location of the second target object in the first target image;
    wherein the acquiring, based on the continuous images comprising the first target object, a first target image from which a background has been removed comprises:
    obtaining a weight distribution graph of a current frame of image based on weights of a color value of the first target image in the current frame of image among the plurality of frames of continuous images, wherein the weights are used to represent weights of the color value of the first target object in all color values of the current frame of image;
    determining, in the weight distribution graph, a square comprising the first target object; and acquiring, based on the square of the first target object, the first target image from which the background has been removed.

2. The method according to claim 1, wherein the obtaining a weight distribution graph of a current frame of image based on weights of a color value of the first target image in the current frame of image among the plurality of frames of continuous images comprises:

acquiring the weights of the color value of the first target object in the plurality of frames of images; and mixing and filtering the weights of the color value of the first target object in the plurality of frames of images, to obtain the weight distribution graph of the current frame of image.

3. The method according to claim 2, wherein the acquiring the weights of the color value of the first target object in the plurality of frames of images comprises:

storing a first acquired image comprising the first target object, and acquiring a background image and a gradient background image of the first target object based on the first image comprising the first target object;

subtracting a background image of a previous frame of image from the color value of the current frame of image, to obtain a first weight;

subtracting a gradient background image of the previous frame of image from the color value of the current frame of image, to obtain a second weight;

subtracting the background image of the previous frame of image from a color gradient of the current frame of image, to obtain a third weight;

subtracting a preset gradient in gradients of the background image of the previous frame of image from the color value of the current frame of image, to obtain a fourth weight; and subtracting a main color value of the first target object from the color value of the current frame of image, to obtain a fifth weight.

4. The method according to claim 3, wherein the mixing and filtering the weights of the color value of the first target object in the plurality of frames of images, to obtain the weight distribution graph of the current frame of image comprises:

performing weighting on the first weight, the second weight, the third weight, the fourth weight, and the fifth weight based on a preset ratio, to obtain a mixed weight;

performing weight processing on the mixed weight, wherein a weight used to perform the weight processing tends to decrease from a center of the current frame of image to a boundary of the current frame of image;

adding an image obtained after the weight processing to weights in a weight distribution graph of the previous frame of image, and performing averaging processing; and extracting a preset quantity of weights from weights obtained after the averaging processing, and subtracting the preset quantity of weights from the weights obtained after the averaging processing, to obtain the weight distribution graph of the current frame of image.

5. The method according to claim 1, wherein the determining, in the weight distribution graph, a square comprising the first target object comprises:

determining a plurality of squares based on color values in the weight distribution graph, and selecting, from the plurality of squares, a square satisfying a preset condition, wherein the preset condition comprises:

a weight in the square is higher than a preset target value;

an area of the square is within a first preset range;

a length of the square in a first dimension and a length of the square in a second dimension are within a second preset range, wherein the first dimension is perpendicular to the second dimension; or a difference between a total weight of squares of the current frame of image and an average total weight of a preset quantity of previous images is within a third preset range.

6. The method according to claim 5, wherein the determining a plurality of squares based on color values in the weight distribution graph comprises:

step A: determining a point with a maximum weight in the weight distribution graph;

step B: using the point with the maximum weight as a second center point, and expanding a square to a fourth preset range;

step C: after the square is expanded to the fourth preset range, shrinking the square, until an average value of color values at edges of the square is less than an average value of a preset ratio and a sum of the color values of the image;

step D: clearing color values in a range determined by the square; and step E: repeating step A to step D, to obtain the plurality of squares.

7. The method according to claim 6, wherein the acquiring, based on the square of the first target object, the first target image from which the background has been removed comprises:

determining a main color of the first target object, and determining a similar color of the main color, wherein a color difference between the similar color and the main color is within a preset color difference range;

determining the first center point in coordinates of the similar color, wherein coordinates of the first center point are closest to the second center point among coordinates of all similar colors; and determining a preset quantity of points outward in a preset direction by using the first center point as a center, and if any point indicates a similar color of the main color, connecting points that indicate the similar color of the main color, and performing expansion outward and re-determining points, until determined points do not comprise the similar color.

8. The method according to claim 1, wherein the acquiring, based on a distance from a first center point of the first target image to a common boundary, a location of a second target object in the first target image comprises:

determining an upper limit and a lower limit of the second target object based on a largest distance from the first center point to the common boundary; and removing points above the upper limit and points below the lower limit from the location, to obtain the second target object.

9. The method according to claim 8, wherein after the second target object is acquired, the method further comprises:

acquiring image information of the second target object, and storing the image information in a preset format, wherein the image information comprises coordinates of a square and a size of the second target object.

10. A device for acquiring a target object, comprising:

a first acquisition module, configured to acquire a plurality of frames of continuous images in video images, wherein each frame of image comprises a first target object;

a second acquisition module, configured to acquire, based on the continuous images comprising the first target object, a first target image from which a background has been removed;

a third acquisition module, configured to acquire, based on a distance from a first center point of the first target image to a common boundary, a location of a second target object in the first target image, wherein the first center point is determined based on a color of the second target object, the common boundary is an overlapping boundary of the second target object and the first target object, and the second target object is comprised in the first target object; and an extraction module, configured to extract the second target object based on the location of the second target object in the first target image;

wherein the second acquisition module comprises:

a first acquisition submodule, configured to obtain a weight distribution graph of a current frame of image based on weights of a color value of the first target image in the current frame of image among the plurality of frames of continuous images, wherein the weights are used to represent weights of the color value of the first target object in all color values of the current frame of image;

a first determining submodule, configured to determine, in the weight distribution graph, a square comprising the first target object; and a second acquisition submodule, configured to acquire, based on the square of the first target object, the first target image from which the background has been removed.

11. The device according to claim 10, wherein the first acquisition submodule comprises:

an acquisition unit, configured to acquire the weights of the color value of the first target object in the plurality of frames of images; and a mixing and filtering unit, configured to mix and filter the weights of the color value of the first target object in the plurality of frames of images, to obtain the weight distribution graph of the current frame of image.

12. The device according to claim 10, wherein the third acquisition module comprises:

a second determining submodule, configured to determine an upper limit and a lower limit of the second target object based on a largest distance from the first center point to the common boundary; and a removal submodule, configured to remove points above the upper limit and points below the lower limit from the location, to obtain the second target object.

13. The device according to claim 12, wherein the device further comprises:

a storage module, configured to acquire image information of the second target object, and store the image information in a preset format, wherein the image information comprises coordinates of a square and a size of the second target object.

14. A robot, comprising the device for acquiring a target object according to claim 10.

15. The device according to claim 11, wherein the acquisition unit is configured to:

store a first acquired image comprising the first target object, and acquire a background image and a gradient background image of the first target object based on the first image comprising the first target object;

subtract a background image of a previous frame of image from the color value of the current frame of image, to obtain a first weight;

subtract a gradient background image of the previous frame of image from the color value of the current frame of image, to obtain a second weight;

subtract the background image of the previous frame of image from a color gradient of the current frame of image, to obtain a third weight;

subtract a preset gradient in gradients of the background image of the previous frame of image from the color value of the current frame of image, to obtain a fourth weight; and subtract a main color value of the first target object from the color value of the current frame of image, to obtain a fifth weight.

16. The device according to claim 15, wherein the mixing and filtering unit is configured to:

perform weighting on the first weight, the second weight, the third weight, the fourth weight, and the fifth weight based on a preset ratio, to obtain a mixed weight;

perform weight processing on the mixed weight, wherein a weight used to perform the weight processing tends to decrease from a center of the current frame of image to a boundary of the current frame of image;

add an image obtained after the weight processing to weights in a weight distribution graph of the previous frame of image, and perform averaging processing; and extract a preset quantity of weights from weights obtained after the averaging processing, and subtract the preset quantity of weights from the weights obtained after the averaging processing, to obtain the weight distribution graph of the current frame of image.

17. The device according to claim 10, wherein the first determining submodule is configured to:

determine a plurality of squares based on color values in the weight distribution graph, and select, from the plurality of squares, a square satisfying a preset condition, wherein the preset condition comprises:

a weight in the square is higher than a preset target value;

an area of the square is within a first preset range;

a length of the square in a first dimension and a length of the square in a second dimension are within a second preset range, wherein the first dimension is perpendicular to the second dimension; or a difference between a total weight of squares of the current frame of image and an average total weight of a preset quantity of previous images is within a third preset range.

18. The device according to claim 17, wherein the first determining submodule is configured to determine the plurality of squares based on the color values in the weight distribution graph through the following steps:

step A: determining a point with a maximum weight in the weight distribution graph;

step B: using the point with the maximum weight as a second center point, and expanding a square to a fourth preset range;

step C: after the square is expanded to the fourth preset range, shrinking the square, until an average value of color values at edges of the square is less than an average value of a preset ratio and a sum of the color values of the image;

step D: clearing color values in a range determined by the square; and step E: repeating step A to step D, to obtain the plurality of squares.

\* \* \* \* \*